United States Patent [19]

Goldby

[11] 4,071,067

[45] Jan. 31, 1978

[54] SELF-LOCKING SCREW THREADS

[75] Inventor: Richard Charles Goldby, Willenhall, England

[73] Assignee: Charles Richards Fasteners Limited, Wednesbury, England

[21] Appl. No.: 677,290

[22] Filed: Apr. 15, 1976

[51] Int. Cl.² ............................................. F16B 39/30
[52] U.S. Cl. ..................................... 151/22; 10/10 R
[58] Field of Search ............... 151/22, 14 R; 10/10 R, 10/86 A

[56] References Cited

U.S. PATENT DOCUMENTS

| 2,371,365 | 3/1945 | Tomalis et al. | 151/22 |
|---|---|---|---|
| 3,444,916 | 5/1969 | Thurston | 151/22 |
| 3,459,250 | 8/1969 | Tabor | 151/22 |
| 3,481,380 | 12/1969 | Breed | 151/22 |
| 3,523,565 | 8/1970 | Olsen | 151/22 |
| 3,661,194 | 5/1972 | MacFarlane et al. | 151/22 |
| 3,885,613 | 5/1975 | Evans | 151/22 |

Primary Examiner—Ramon S. Britts
Attorney, Agent, or Firm—Scrivener, Parker, Scrivener & Clarke

[57] ABSTRACT

A screw threaded member having a thread with at least two portions of different form, one portion being of standard form and the other portion, a locking portion, having its root and crest offset from the standard lead, the offset of the crest being in the same direction as and greater than the offset of the root, the flanks of the locking thread being correspondingly displaced and the flank on the side of the thread which is displaced away from the standard pitch line being bulged outwardly. The root offset may be between one third and two thirds of the offset of the crest. The offsets may be in either direction but are preferably in that direction which moves the lead flank away from the standard pitch line.

10 Claims, 4 Drawing Figures

SELF-LOCKING SCREW THREADS

This invention relates to screw threaded members and particularly to members having a portion or portions of their thread modified from a standard form to provide a locking thread which imparts to the member a self-locking action when engaged with another member having a complementary standard mating thread. It is to be understood that the term standard used herein in reference to a thread form means any form which is of constant profile, pitch and pitch diameter.

Various forms of locking threads have been proposed including threads with variations in profile, pitch diameter, pitch or crest or root lead. For example U.S. patent specification No. 3,459,250 shows an externally threaded member in which a locking portion of thread is provided by offsetting a portion at the crest of a segment of each of several successive thread turns. However it has been found that the maximum locking torque which can be provided by such a form of locking thread is not as great as is desirable. Also it is known, as is shown in U.S. patent specification No. 3,426,820 to form a screw having a trilobular form in cross-section and with thread crests which are thinned and extend beyond the conventional external thead major diameter. The extended portion of the crests assisted by the trilobular form bite into the root of the internal thread to provide locking engagement. This results in permanent damage to the internally theaded member. Additionally, the degree of interference can be rather variable due to manufacturing tolerance, particularly of the internal thread major diameter.

British patent specification No. 569,581 describes a bolt or stud having a portion of thread of progressively increasing or decreasing pitch. In this case the locking effect could vary considerably depending on the number of threads engaged and also on the portions of modified thread engaged. The interference will increase as pitch error increases.

Another example of a locking thread is that shown in U.S. patent specification No. 3,885,613. It employs a male thread with roots of increased radius, i.e. partially filled in, and designed to engage and deform the crests of the threads on a standard nut applied to it.

U.S. patent specification No. 2,586,786 shows a thread which has a portion with modified pitch. This is accomplished by displacing one flank, which alters the pitch interval and in effect increases the pitch diameter. The position of the second flank remains unaltered. A thicker thread is thus produced with one flank sufficiently extended to provide interference with the mating thread. The disadvantages with the design are first, the thickened thread reduces the possibility of elastic displacement and thus increases the risk of thread galling, and second, the thickened threads of the locking profile requires more metal to fill. Therefore, when thread rolling, the crests of the locking threads would not be fully filled but would be flattened in appearance.

U.S. patent specification Nos. 3,460,598 and 3,444,916 describe screw threads having a standard root lead along their entire length, there being a portion along which the crest lead varies from the standard so that effectively the thread profile is tilted in the locking portion. There is a maximum interference between a locking thread and the complementary mating thread at the crest of one and the root of the other, giving rise to high bending stresses in the thread rib loaded at its crest. Where the threads are oversize by the maximum permitted by the tolerance limits to which they are manufactured the interference between the locking thread and its mating thread may be so severe as to lead to permanent damage to the threads.

It is an object of the present invention to provide a form of locking thread in which the difficulties described above are reduced.

According to the present invention we provide a screw threaded member having a thread with at least two portions of different form, one portion being of standard form and the other portion, a locking portion, having its root and crest offset from the standard pitch, the offset of the crest being in the same direction as and greater than the offset of the root, the flanks of the locking thread being correspondingly displaced and the flank on the side of the thread which is moved outwards away from the standard thread profile being bulged outwardly. Preferably the offset of the root is no less than one third and no greater than two thirds of the offset of the crest. The offsets may be in either direction but are preferably in that direction which moves the lead flank away from the standard pitch line, that is the centre line of the profile of the standard thread rib.

With the locking thread of the invention interference between the locking thread and complementary standard mating thread is a maximum at or close to the pitch diameter and decreases towards the roots and crests of the threads. Thus stresses on the threads are equalised. Further, since dimensionally the most closely controlled parts of a rolled thread are the flanks, particularly at their centre in the region of the pitch diameter, the locking action is concentrated in the most accurately manufactured part of the thread.

The number and arrangement of locking threads may be varied as desired. There may be more than one group of locking threads. In one particular arrangement groups of locking threads are provided at regular intervals along a threaded member. For example a screw may be provided with alternately one turn of standard thread and two turns of locking thread along the entire length of its thread.

The threads on screws or any other externally threaded member having locking threads in accordance with the invention can readily be produced by thread rolling and according to another feature of the invention we provide dies for rolling such threads.

Some embodiments of the invention will now be described, by way of example only, with reference to and as shown in the accompanying drawings, in which.

Figure 1:
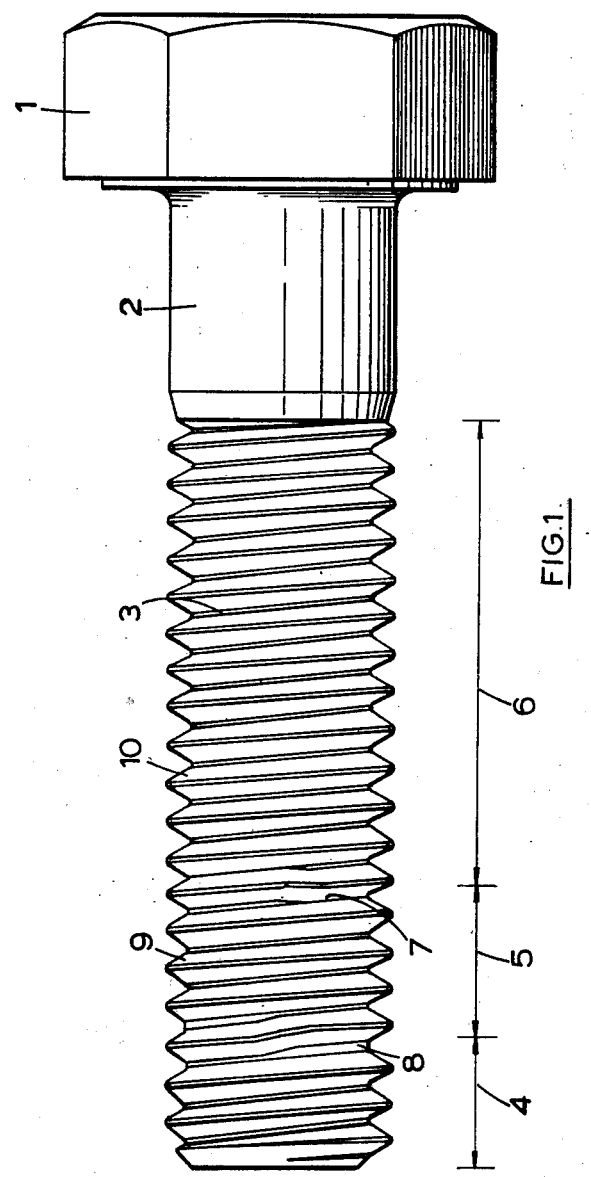
FIG. 1 shows a bolt having a thread formed in accordance with the invention.

The bolt shown in FIG. 1 is of a well known form having a hexagonal head 1, a plain section 2 of shank adjacent to the head and a threaded section 3 of shank. The thread on the section 3 is formed in three portions all having the same constant nominal thread diameter and thread depth. A first portion 4 comprises three turns of a standard thread 10, lead thread, extending from the free end of the bolt. The second portion 5 comprises four turns of locking thread 9 following the lead thread. The third portion 6 comprises further turns of the standard thread extending between the locking thread and the plain section 2 of the shank. A transition zone 7,8 extends over one turn between each end of the locking portion 5 and the standard sections 4,6. The transition zones 7,8 are shown in an exaggerated style in FIG. 1 for clarity.

Figure 2:
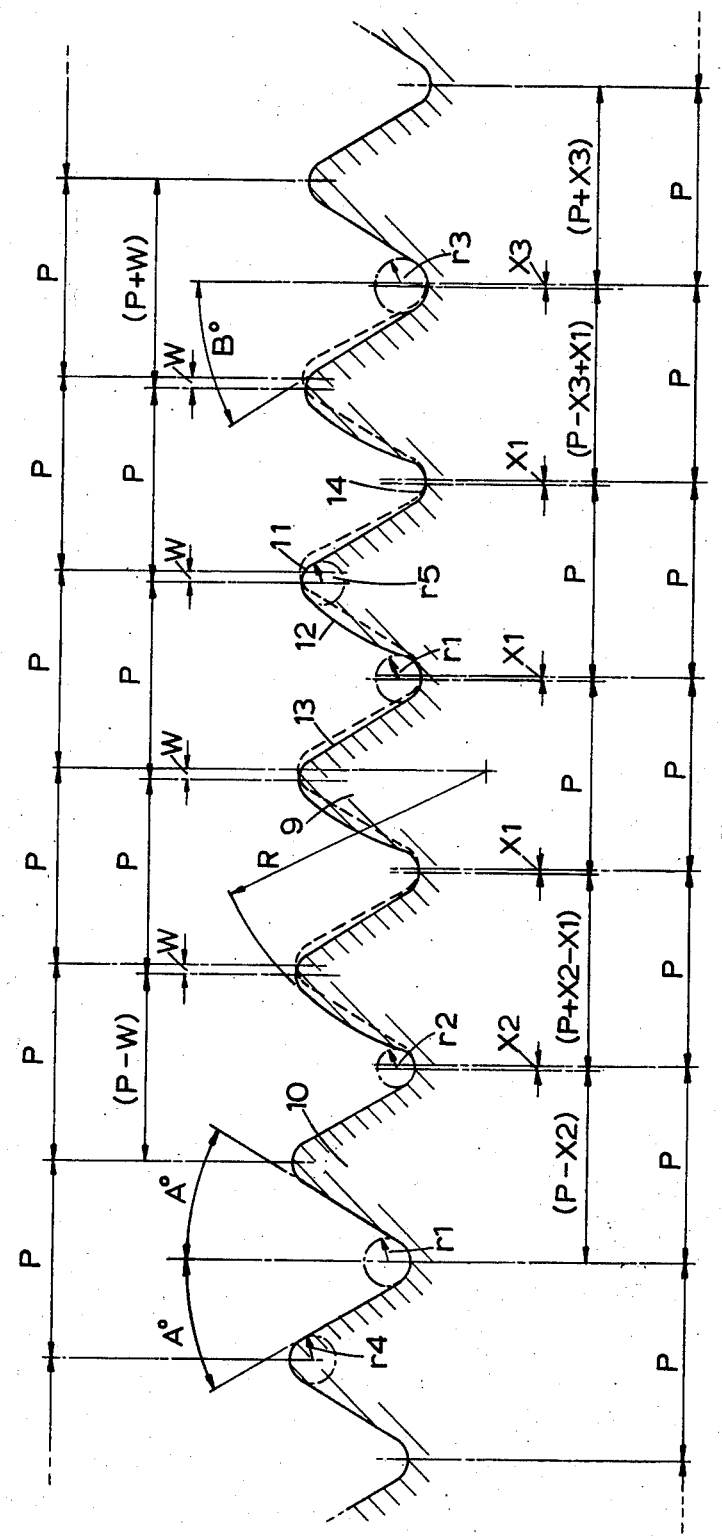
FIG. 2 shows in detail the profile of some of the thread ribs of the bolt.

FIG. 2 shows the profile of the four turns of locking thread 9 together with a number of turns of adjacent standard thread 10 from the first and second portions 4,6 of standard thread. The standard thread is of symmetrical form with a pitch P, flank angle A°, crest radius $r4$, and root radius $r1$. These parameters may be selected in accordance while any desired standard such as is specified for national or international standard thread series or so as to provide a desired special thread form of constant pitch, diameter and depth. The threads of the first and second portions 4,6 have the same lead, i.e. the interval between corresponding points on the profile of the thread ribs of the first and second sections is equal to integral multiples of the standard pitch interval P.

The thread ribs 9 of the locking portion 5 are offset from the standard lead towards the head 1 of the bolt. The offset is shown in FIG. 2 by indicating the standard profile in dotted lines superimposed on the outline of the locking thread ribs 9. The crests 11 of the locking thread ribs 9 are offset by a distance W and the roots 12 by a lesser distance X1. It has been found that the value of X1 is desirably between about one third and two thirds of W although no precise relationship between these values has been established. In addition to being offset the locking thread ribs 11 have a convex lead flank 12, that is the flank of the thread rib which faces the head 1 on the bolt. The convex flank 12 is shown as being of arcuate form having radius R centred on the standard pitch line of the preceeding thread. However a different radius of curvature and arc centre may be adopted. Alternatively the convex flank 12 may not be of arcuate form, the radius of curvature varying across the flank.

The radius of the roots 14 of the locking thread ribs 9 is the same as the standard root radius $r1$. The crest radius is reduced from the standard $r4$ to $r5$ and a corresponding increase is made in the angle of the trailing flank 13 B° in addition to the change in angle due to the different displacements of the root and crest. This alteration to the crest radius and trailing flank angle at the locking thread is necessary to compensate for the convex form of the leading flank 12 so that the area of the profile of each locking thread rib 9 is substantially the same as the area of each standard thread rib 10. This is necessary to facilitate correct formation of the thread during manufacture by rolling. However it should be noted that it is often the case that the crest of an external thread is not completely filled during rolling and has a somewhat flattened contour instead of the designed round contour. In a locking thread designed in accordance with the invention this is not of concern since the crest 11 does not play a part in the locking action. For this reason a slight difference between the areas of the standard and locking thread profiles can be tolerated.

The transition between the standard and locking threads is made over one twelfth of a thread turn in which the profile and pitch is continuously varied. In order to accommodate the resulting offset between adjacent locking and standard threads at the transitions it is necessary to vary the root radius. At the transition zone 8 between the lead thread of the first portion 4 of the shank and the locking thread portion 5 the root radius increases from the standard value $r1$ to a maximum $r3$ in the twelfth of a turn in which the transition occurs. The root radius remains at the maximum value for the rest of that thread turn and then decreases back to $r1$ in a further twelfth of a turn. Likewise at the transition zone 7 there is a decrease in root radius to a minimum of $r2$ at the transition between the locking thread 9 and the standard thread 10 of the portion 6 of the shank.

It is normal in screw thread standards to define the root radius of an external screw thread as being between two limiting values. Although this allows for considerable variations in the root radius when designing a thread according to such standards it is possible that the designed decreased root radius $r2$ and increased root radius $r3$ at the transition zones 7,8 may fall outside the specified limits for the value of root radius when the invention is applied to a screw having a thread based on such a standard.

The pitch intervals of the crests and roots also vary from the standard value P at the transition zones. The pitch interval of the crests is increased by the crest offset W to (P+W) at the transition zone 8 and correspondingly reduced by W to (P−W) at the transition zone 7, the pitch intervals between all other adjacent crests being the standard value P in both the portions of locking thread 9 and standard thread 10. Owing to the variations in root radius at the transition zones 7,8 the offsets at the roots in the transition zones differ from the offset X1 of the roots of the locking thread. These offsets at the transition zone are shown as X2 and X3 in FIG. 2 and the corresponding root pitch intervals taken in order from the head end of the bolt are

P, ...
P,P,P,(P−X2),(P+X2−X1),P,P,(P−X3+X1),(-P+X3),P,P,P

The transition between standard and locking threads may alternatively be made gradually altering pitch and profile over a full thread turn.

Figure 3:
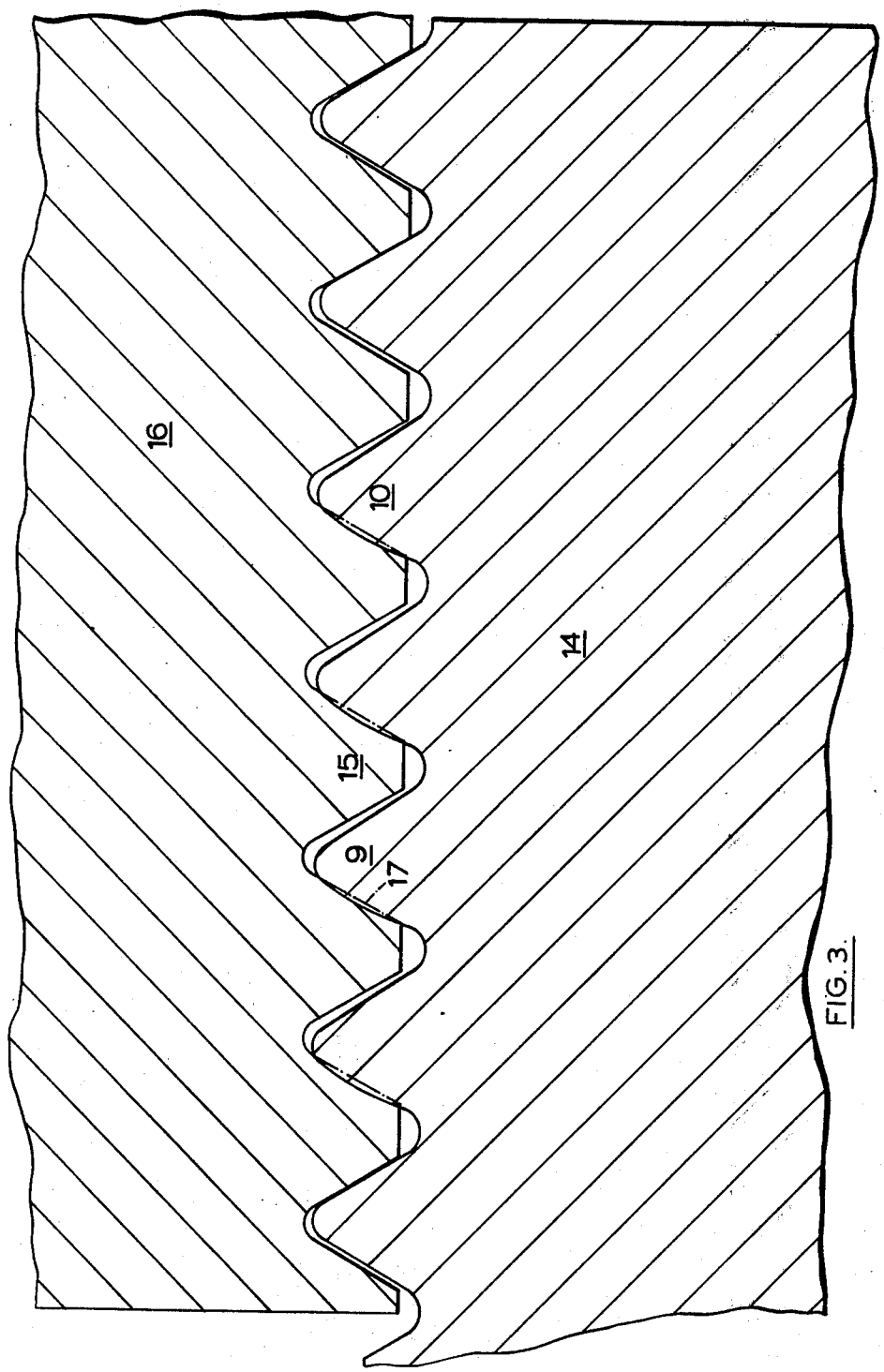
FIG. 3 shows a section through some of the thread ribs of the bolt in engagement with a corresponding standard female thread.

From FIG. 3 the relationship between the locking threads 9 of a male member 14 and standard threads 15 of a female member 16 can be seen, the overlap of the profiles of the threads in the unloaded state is indicated by chain-dotted lines at 17. This overlap region shows that there is maximum interference between the male locking threads 9 and the standard female threads 15 at or near the pitch diameter of the thread. The interference decreases towards the roots and crests of the locking thread 9 and corresponding female thread 15. Thus stresses in the threads 9,15 are not concentrated near crest or root and a balance in distribution of bending stresses in the male and female threads is obtained. It should also be noted that the greatest interference between the mating threads occurs at the centre of the thread flanks, dimensionally this most closely controlled part of a rolled thread. The interference decreases towards the crest and root where dimensional control is considerably less. Thus in a bolt embodying the invention the prevailing torque produced by the locking threads varies to a lesser extent than in known bolts manufactured to the same dimensional standards.

Figure 4:
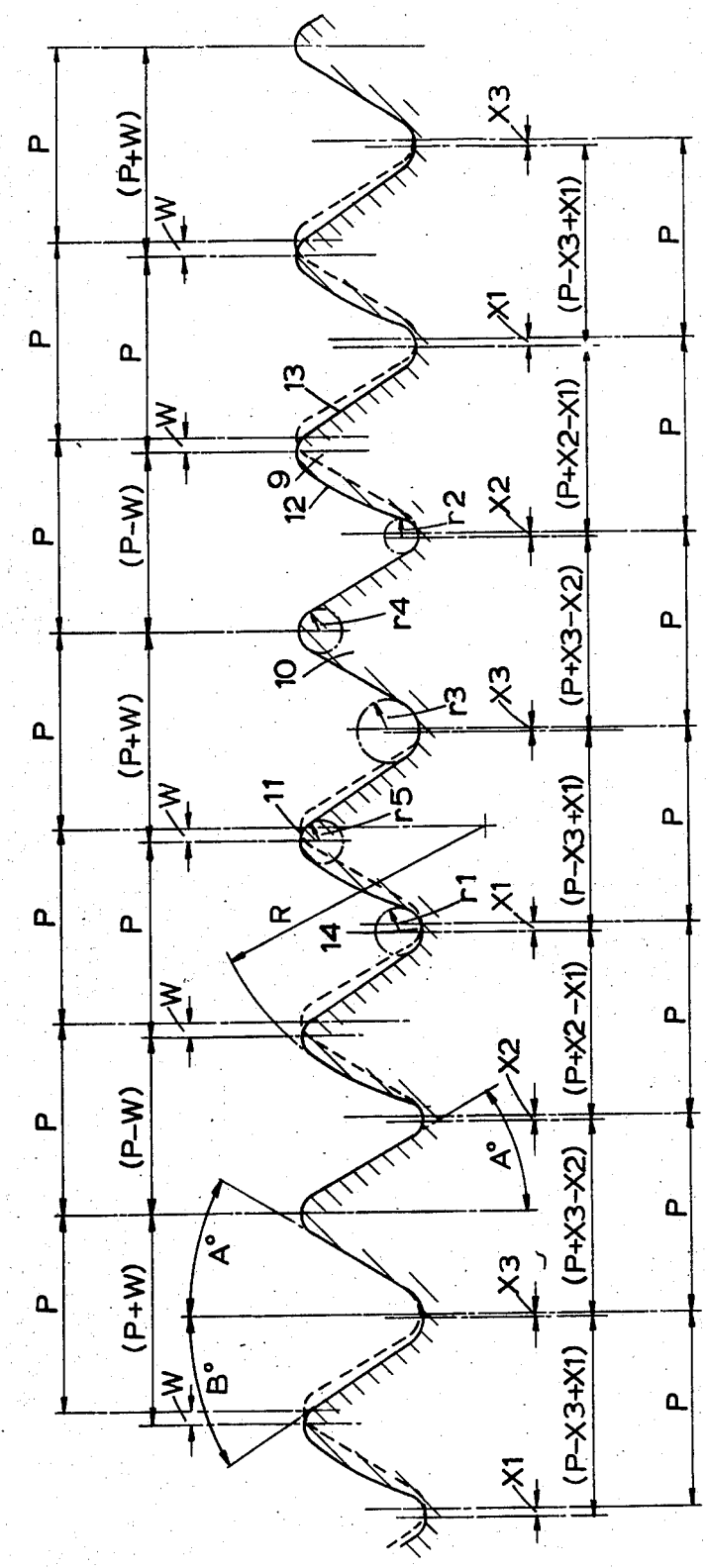
FIG. 4 shows in detail the profile of some thread ribs of another member threaded in accordance with the invention.

One particular form of bolt has been described above but it will be clear that the invention can be applied to any threaded male member. Also the arrangement of standard and locking thread turns may be varied. One particular variation is shown in FIG. 4. In the arrangement shown the thread is formed with alternate sections, one section comprising two turns of locking thread 9 and the other section comprising one turn of standard thread 10. More turns of locking thread or standard thread may be provided in the sections if desired. The advantage of this arrangement is that a locking effect is obtained throughout the length of the threaded member. For this reason this arrangement is greatly preferred for bolts and screws produced in stock lengths for general usage. Furthermore one pair of rolling dies can be used to produce different length bolts and screws.

The geometry of the thread profiles shown in FIG. 4 is the same as in FIG. 2 and throughout FIG. 4 the reference letters and numerals have the same meaning as ascribed to them in the description relating to FIG. 4. In this arrangement in FIG. 4 each thread is adjacent to a transition zone and consequently the pitch intervals of both the crests and roots vary in sequence along the thread. By studying FIG. 4 it can be seen that the crest intervals follow the sequence $$\ldots,(P+W),(P-W),P,(P+W),(P-W),P,\ldots$$

and the root intervals follow the sequence $$\ldots,(P-X3+X1),(P+X3-X2),(P+X2-X1),(P-X3+X1),(P+X3-X2),\ldots$$

In the bolts described above the offsets of the crests and roots are towards the head of the bolt. However the profile of the locking thread may be reversed with the offsets away from the bolt head and the trailing flank bulged.

The threads of the bolts described can readily be formed by rolling between dies.

I claim:

1. A screw threaded member having a first portion of thread of a standard form having constant profile, pitch, root diameter and crest diameter, and a second portion of thread of a locking form continuous with said standard portion of thread and having said constant root diameter and constant crest diameter but having a root lead offset from the standard root lead, a crest lead offset from the standard crest lead, the crest offset being greater than the root offset, the flanks of said locking form of thread being displaced from the position of the flanks of thread of said standard form by an amount corresponding to said root and crest lead offsets, a first of the displaced flanks being bulged outwardly, the bulging being greatest in a central region of the flank and decreasing continuously towards the crest and towards the root thereof, the second of the displaced flanks being offset in the direction of said bulged flank.

2. A member in accordance with claim 1 where said second of said displaced flanks has an angle altered additionally to compensate for the bulging of said first flank whereby the area of a rib of the profile of said locking thread form is substantially the same as the area of a rib of the profile of said standard thread form.

3. A member according to claim 1 wherein said root offset is in the range one third to two thirds of said crest offset.

4. A member in accordance with claim 1 wherein said offsets are in the direction of the lead flank.

5. A member in accordance with claim 1 wherein the profile of said first flank, which is bulged outwardly, is arcuate.

6. A member in accordance with claim 1 having a transition zone between said first portion of standard thread form and said second portion of said locking thread form wherein the pitch and profile is continuously varied over a part of one turn and the root radius is varied over the rest of said one turn whereby said offsets between said thread forms is accommodated at said transition zone.

7. A member in accordance with claim 6 wherein said part of one turn is one twelfth of said turn.

8. A member in accordance with claim 1 having a plurality of portions of thread of said standard form and arranged alternately therewith a plurality of portions of thread of said locking form.

9. A member in accordance with claim 8 wherein said portions of locking thread form each comprises two thread turns and said portions of standard thread form each comprises one thread turn.

10. A member in accordance with claim 1 including a third portion of thread which is of said standard form and has the same lead as said first portion, said second portion being located between said first portion and said third portion.

* * * * *